(12) United States Patent
Kato et al.

(10) Patent No.: US 7,753,428 B2
(45) Date of Patent: Jul. 13, 2010

(54) VEHICLE SEAT DEVICE

(75) Inventors: Hideyuki Kato, Toyota (JP); Takahiro Sugama, Nishikamo-gun (JP); Masami Natsume, Nagoya (JP); Takahiro Kan, Toyota (JP); Mikihito Muramatsu, Okazaki (JP)

(73) Assignees: Toyota Jidosha Kabushiki Kaisha, Toyota-shi, Aichi-ken (JP); Toyota Shatai Kabushiki Kaisha, Kariya-shi, Aichi-ken (JP); Toyota Boshoku Kabushiki Kaisha, Kariya-shi, Aichi-ken (JP)

( * ) Notice: Subject to any disclaimer, the term of this patent is extended or adjusted under 35 U.S.C. 154(b) by 8 days.

(21) Appl. No.: 12/297,447

(22) PCT Filed: Apr. 17, 2007

(86) PCT No.: PCT/JP2007/058352
§ 371 (c)(1),
(2), (4) Date: Oct. 17, 2008

(87) PCT Pub. No.: WO2007/123128
PCT Pub. Date: Nov. 1, 2007

(65) Prior Publication Data
US 2009/0102222 A1     Apr. 23, 2009

(30) Foreign Application Priority Data
Apr. 20, 2006   (JP) ............................... 2006-116818

(51) Int. Cl.
*B60N 2/04*     (2006.01)
*B60N 2/30*     (2006.01)

(52) U.S. Cl. .............. 296/65.09; 296/65.08; 296/65.16; 296/65.17; 297/344.1; 297/344.22

(58) Field of Classification Search .............. 296/65.01, 296/67, 65.05, 65.08, 65.09, 65.03, 65.11, 296/65.12, 65.16–65.18; 297/14, 12, 16.1, 297/331, 335, 344.1, 378.1, 378.12, 378.13, 297/383, 344.22
See application file for complete search history.

(56) References Cited

U.S. PATENT DOCUMENTS 5,707,103 A * 1/1998 Balk ........................... 297/13

(Continued)

FOREIGN PATENT DOCUMENTS

JP          5-170021          7/1993

(Continued)

*Primary Examiner*—Glenn Dayoan
*Assistant Examiner*—Gregory Blankenship
(74) *Attorney, Agent, or Firm*—Finnegan, Henderson, Farabow, Garrett & Dunner, LLP (57) ABSTRACT

Disclosed is a vehicle seat device operating as follows. A retracting instruction is given by a seat switch to start operation of a seat back actuator. Lock of the seat back and a seat cushion is released to rotate the seat back to the position where it is overlapped with the seat cushion. A floor actuator is driven to release engagement between the floor panel and the floor lock. A lift up motor is operated to lift up the vehicle seat device toward the vehicle body. After this, a dragger lock motor is operated to lock a striker on the seat back rear surface and the dragger unit, thereby completing the retraction operation.

8 Claims, 11 Drawing Sheets

U.S. PATENT DOCUMENTS

| | | | | |
|---|---|---|---|---|
| 5,984,397 | A * | 11/1999 | Dawson et al. | 296/65.09 |
| 6,106,066 | A * | 8/2000 | Moffa et al. | 297/332 |
| 6,231,103 | B1 * | 5/2001 | Elson et al. | 296/65.06 |
| 6,669,261 | B2 * | 12/2003 | Roberts et al. | 296/65.09 |
| 6,843,526 | B2 * | 1/2005 | Honda et al. | 297/14 |
| 6,886,878 | B2 * | 5/2005 | Schambre et al. | 296/65.09 |
| 7,118,171 | B2 * | 10/2006 | Fowler et al. | 297/61 |
| 7,118,178 | B2 * | 10/2006 | Daniels | 297/378.1 |
| 7,494,173 | B2 * | 2/2009 | Hatta et al. | 296/65.12 |
| 2004/0256876 | A1 * | 12/2004 | Schambre et al. | 296/65.09 |

FOREIGN PATENT DOCUMENTS

| | | |
|---|---|---|
| JP | 2004-249927 | 9/2004 |
| JP | 2004-249964 | 9/2004 |
| JP | 2005-41406 | 2/2005 |

\* cited by examiner

VEHICLE SEAT DEVICE

TECHNICAL FIELD

The present invention relates to a vehicle seat device, and in particular, to a vehicle seat device that is stored by being sprung-up at the side of a vehicle body.

BACKGROUND TECHNOLOGY

Among vehicles having a cargo compartment, such as wagons, vans, one-box cars and the like, there are those in which the vehicle seats such as the rear seats or the like can be stored by being sprung-up at the vehicle body sides, and the space of the cargo compartment can be utilized effectively.

For example, in the technique disclosed in Patent Document 1, there is proposed providing a headrest collapsible mechanism that collapses a headrest, a reclining mechanism that collapses a seat back, a latch mechanism that anchors a seat cushion to a floor panel, a sliding mechanism that slides a vehicle seat in a vehicle longitudinal direction, a spring-up mechanism that causes the seat to spring-up toward the vehicle side, and the like, wherein the headrest collapsible mechanism, the reclining mechanism, the latch mechanism, the sliding mechanism, and the spring-up mechanism are operated in that order, so as to store the vehicle seat by springing-up at the vehicle body side.

Further, in the technique disclosed in Patent Document 2, there is proposed providing a wind-up device, that permits exit and entry of a webbing having a hook on its distal end, at a vehicle seat. By pulling-out the webbing, fixing the hook to an assist grip or the like provided at the vehicle body, and winding-up the webbing at the wind-up device, the vehicle seat is stored by being sprung-up at the vehicle body side.

Patent Document 1: Japanese Patent Application Laid-Open No. 2004-249927

Patent Document 2: Japanese Patent Application Laid-Open No. 5-170021

DISCLOSURE OF THE INVENTION

Problems to be Solved by the Invention

However, in the technique recited in Patent Document 1, although the vehicle seat is stored electrically, fixing of the vehicle seat at the position where the vehicle seat is stored at the vehicle body side is not considered, and there is room for improvement.

On the other hand, in the technique disclosed in Patent Document 2, the hook, that is provided at the distal end of the webbing, is engaged with the assist grip or the like, and the webbing is wound-up such that the vehicle seat is moved to the vehicle seat storage position and fixed. However, the complex work of pulling-out the webbing and fixing the hook to the assist grip or the like is needed, and there is room for improvement in the storability of the vehicle seat.

The present invention was made in view of the above-described circumstances, and an object thereof is to easily move a vehicle seat to a retracted position and reliably fix the vehicle seat at the retracted position, without placing a burden on the vehicle occupant.

Means For Solving the Problems

In order to achieve the above-described object, a first aspect of the present invention has seat back rotating means for rotating a seat back to a position of being superposed on a seat cushion; engaging means for releasably engaging the seat cushion and a floor panel; seat cushion rotating means for rotating the seat cushion to a vehicle body side with one side, that runs along a vehicle longitudinal direction, of the seat cushion being a center of rotation; connecting means for connecting a rear surface of the seat back and the vehicle body side; instructing means for instructing retraction of a vehicle seat; and controlling means for, in a case in which retraction of the vehicle seat is instructed by the instructing means, controlling the seat back rotating means such that the seat back rotates to the position of being superposed on the seat cushion, and controlling the engaging means such that engagement of the seat cushion and the floor panel is released, and controlling the seat cushion rotating means such that the seat cushion rotates to the vehicle body side, and thereafter, controlling the connecting means such that the rear surface of the seat back and the vehicle body side are connected.

The seat back is rotated by the seat back rotating means to the position of being superposed on the seat cushion, the seat cushion and the floor panel are engaged by the engaging means, and the seat cushion is rotated by the seat cushion rotating means to the vehicle body side with one side, that runs along the vehicle longitudinal direction, of the seat cushion being the center of rotation. Further, the rear surface of the seat back and the vehicle body side are connected by the connecting means.

Here, in a case in which retraction of the vehicle seat is instructed by the instructing means, by the controlling means, the seat back rotating means is controlled such that the seat back rotates to the position of being superposed on the seat cushion, and the engaging means is controlled so as to release the engagement of the seat cushion and the floor panel, and the seat cushion rotating means is controlled such that the seat cushion rotates to the vehicle body side, and thereafter, the connecting means is controlled so as to connect the rear surface of the seat back and the vehicle body side.

Namely, merely due to retraction of the vehicle seat being instructed by the instructing means, the seat back is collapsed toward the seat cushion side by the seat back rotating means, and the engagement of the seat cushion and the floor panel, that are engaged by the engaging means, is released, and the seat cushion is rotated to the vehicle body side by the seat cushion rotating means, and the vehicle seat can thereby be retracted to the vehicle body side. Further, at this time, because the rear surface of the seat back and the vehicle body side are connected by the connecting means, they can be reliably fixed at the time of retraction.

Accordingly, merely due to retraction of the vehicle seat being instructed by the instructing means, the vehicle seat can be retracted to the vehicle body side. Therefore, without placing a burden on the vehicle occupant, the vehicle seat can be easily moved to the retracted position. Further, because the seat back and the vehicle body side are connected by the connecting means, they can be reliably fixed at the retracted position.

Note that, in another aspect of the present invention, the controlling means may carry out control only while instructing of retraction of the vehicle seat is being carried out by the instructing means. By doing so, nipping-in or the like into the vehicle seat at the time of the retracting operation is prevented, and the retracting operation can be executed safely.

Further, in yet another aspect of the present invention, the seat back rotating means can rotate the seat back toward the seat cushion side due to releasing of rotation restriction of a restricting means that restricts rotation of the seat back in a state in which a vehicle occupant can be seated.

Moreover, in still another aspect of the present invention, the instructing means can further have a function of instructing returning of the vehicle seat from a retracted position, and in a case in which the returning of the vehicle seat is instructed by the instructing means, the controlling means can control the connecting means so as to release connection of the rear surface of the seat back and the vehicle body side, and control the seat cushion rotating means such that the seat cushion rotates from the vehicle body side toward the floor panel, and control the engaging means such that seat cushion and the floor panel are engaged, and thereafter, control the seat back rotating means such that an angle formed by the seat back and the seat cushion becomes a predetermined angle.

Further, the instructing means may further have a function of instructing returning of the vehicle seat from a retracted position, and in a case in which the returning is instructed by the instructing means, the controlling means may control the connecting means so as to release connection of the rear surface of the seat back and the vehicle body side, and control the seat cushion rotating means such that the seat cushion rotates from the vehicle body side toward the floor panel side, and thereafter, control the engaging means such that seat cushion and the floor panel are engaged.

EFFECTS OF THE INVENTION

As described above, in accordance with the present invention, merely by carrying out an instruction to retract the vehicle seat, the seat back is rotated to the position of being superposed on the seat cushion, the engagement of the seat cushion and the floor panel is released, the seat cushion is rotated to the vehicle body side and the vehicle seat is retracted to the vehicle body side, and the rear surface of the seat back and the vehicle body side are connected. Therefore, there are the effects that, without placing a burden on the vehicle occupant, the vehicle seat can be easily moved to the retracted position, and further, because the seat back and the vehicle body side are connected, they can be reliably fixed at the retracted position.

PREFERRED FORMS FOR IMPLEMENTING THE INVENTION

Figure 1A:
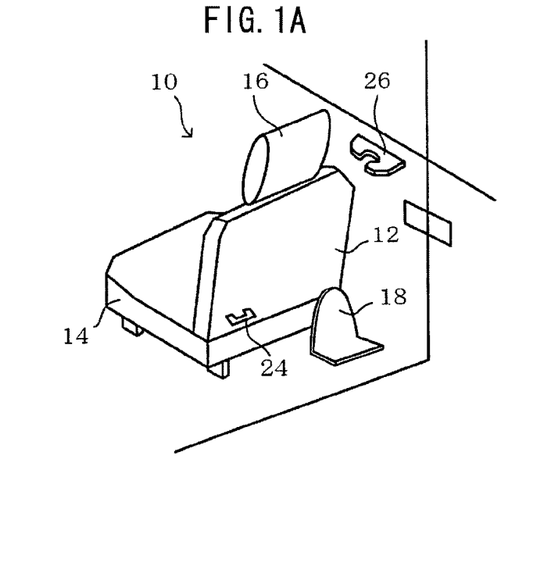
FIG. 1A is a drawing showing an in-vehicle state of a vehicle seat device relating to an embodiment of the present invention.
Figure 1B:
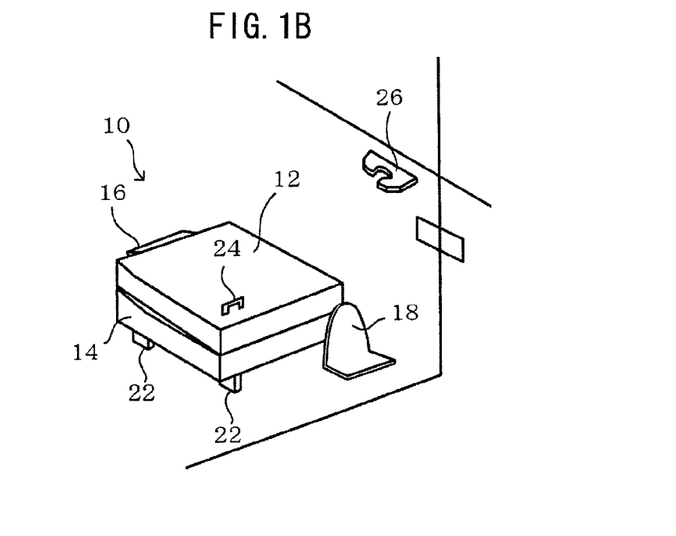
FIG. 1B is a drawing showing the in-vehicle state of the vehicle seat device relating to the embodiment of the present invention.
Figure 1C:
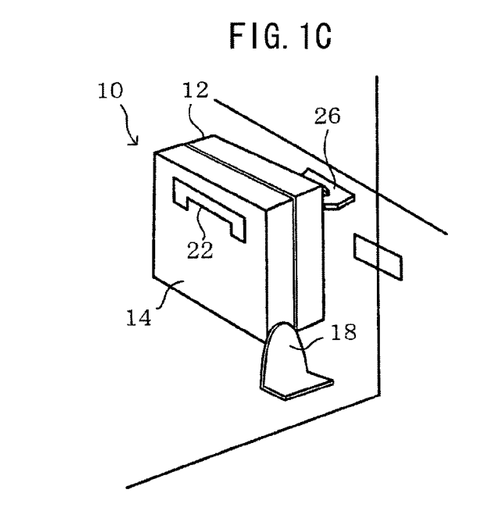
FIG. 1C is a drawing showing the in-vehicle state of the vehicle seat device relating to the embodiment of the present invention.

An example of an embodiment of the present invention will be described in detail hereinafter with reference to the drawings. FIGS. 1A, 1B and 1C show an in-vehicle state of a vehicle seat device relating to the embodiment of the present invention.

A vehicle seat device 10 relating to the embodiment of the present invention is applied as a seat at the rear portion or the like of a vehicle, and, from the state of being unfolded and seatable as shown in FIG. 1A, can be stored at a vehicle body side as shown in FIG. 1C.

With regard to storing the vehicle seat device 10, after a seat back 12 is rotated to a position of being superposed on a seat cushion 14 as shown in FIG. 1B, the vehicle seat device 10 is rotated around one side, that runs along the vehicle longitudinal direction, of the seat cushion 14, and is stored at the vehicle body side as shown in FIG. 1C.

Figure 2A:
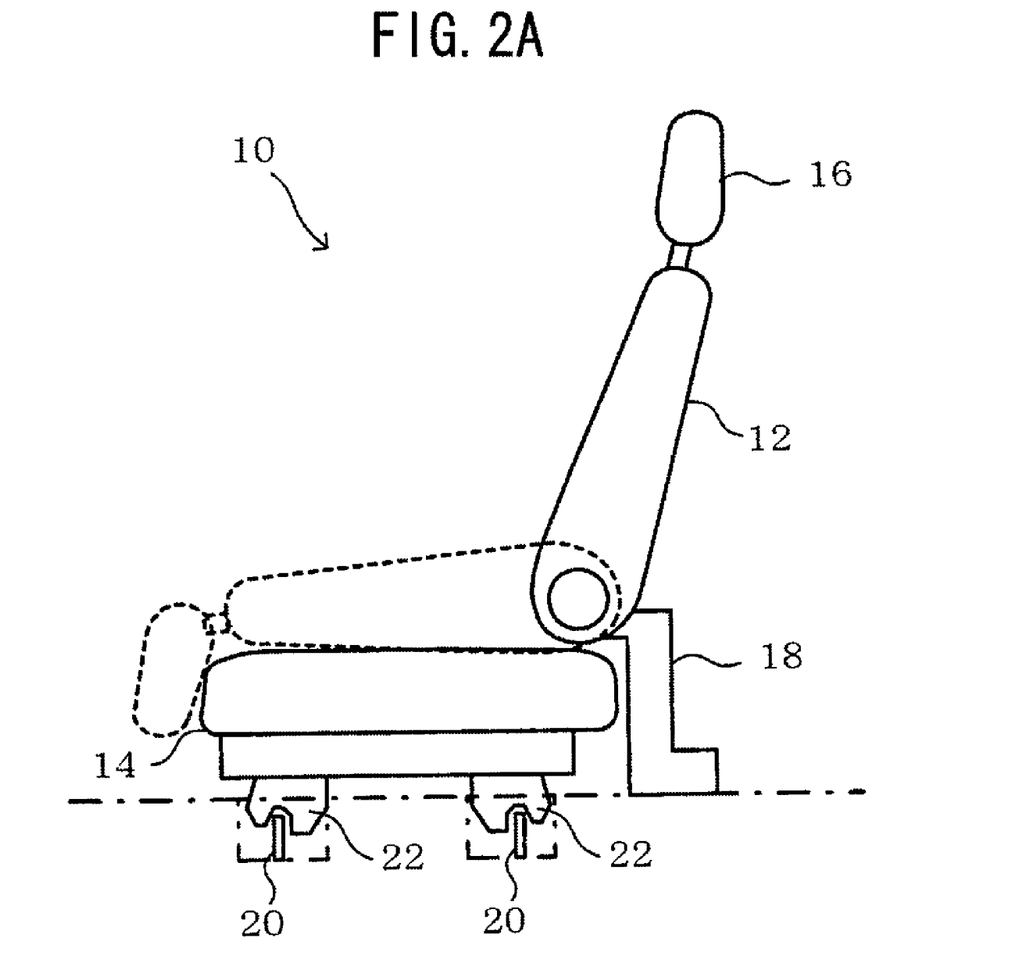
FIG. 2A is a drawing showing the structure of the vehicle seat device relating to the embodiment of the present invention.
Figure 2B:
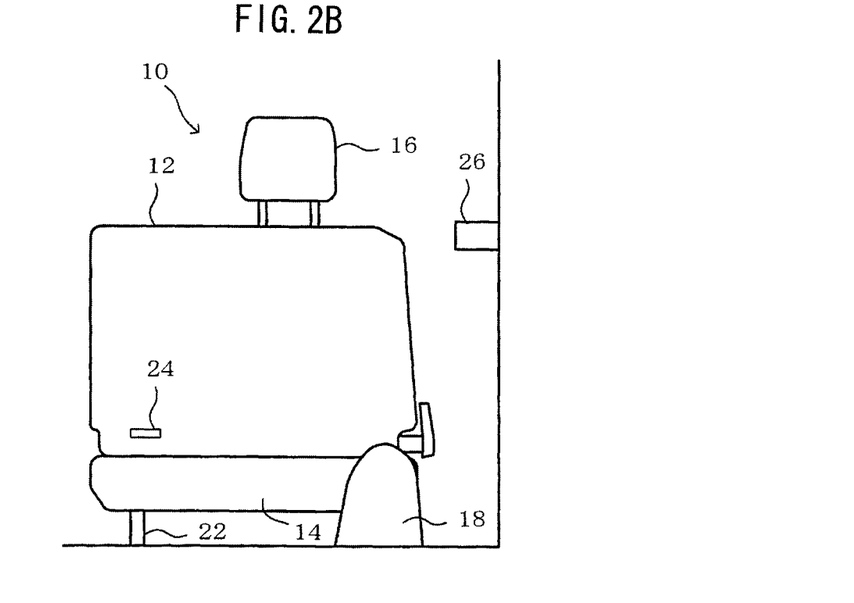
FIG. 2B is a drawing showing the structure of the vehicle seat device relating to the embodiment of the present invention.
Figure 2C:
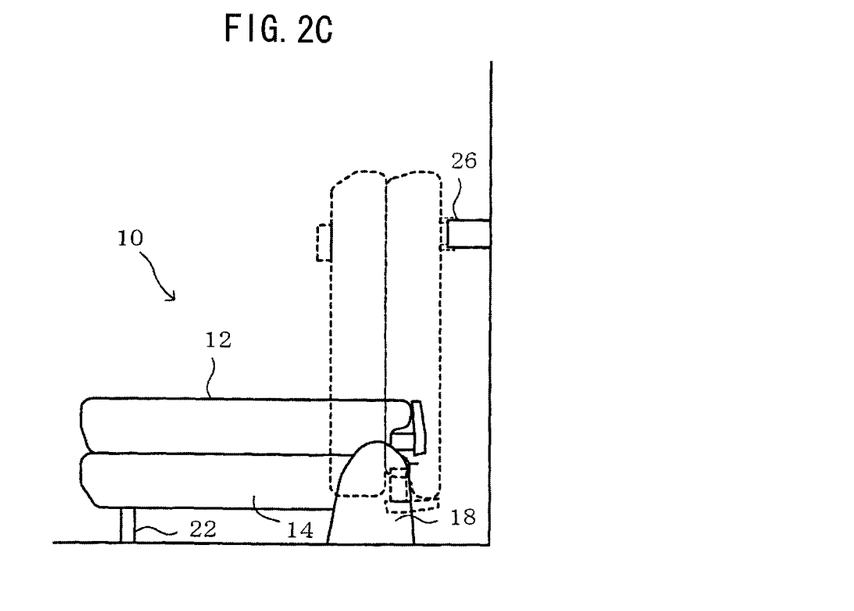
FIG. 2C is a drawing showing the structure of the vehicle seat device relating to the embodiment of the present invention.

FIGS. 2A, 2B and 2C show the structure of the vehicle seat device 10 relating to the embodiment of the present invention.

As shown in FIG. 2A, at the vehicle seat device 10 relating to the embodiment of the present invention, the seat cushion 12 is rotated until a position of being superposed on the seat cushion 14, and is collapsed toward the front of the vehicle. At this time, a headrest 16 is simultaneously rotated and collapsed toward the front of the vehicle, and in the state in which the seat back 12 is superposed on the seat cushion 14, the amount of projection of the headrest 16 toward the front of the vehicle is made to be small.

Further, at the vehicle seat device 10 relating to the embodiment of the present invention, there is provided a lift-up unit 18 that rotates the vehicle seat device 10 around one side, that runs along the vehicle longitudinal direction, of the seat cushion 14 and lifts-up the vehicle seat device 10. The vehicle seat device 10 is lifted-up to the vehicle body side by the lift-up unit 18 as shown in FIG. 1C and FIG. 2C.

Floor locks 22, that engage with lock strikers 20 provided at a floor panel, are provided at the floor panel side of the seat cushion 14, which is the side opposite the lift-up unit 18. The floor locks 22 and the lock strikers 20 engage, and the vehicle seat device 10 and the floor panel are fixed.

Further, when the vehicle seat device 10 is lifted-up to the vehicle body side by the lift-up unit 18, a striker 24, that is provided at the rear surface of the seat back 12, and a dragger unit 26, that is provided at the vehicle body side, are connected, and the vehicle seat device 10 is fixed in a stored state by the dragger unit 26.

Figure 3:
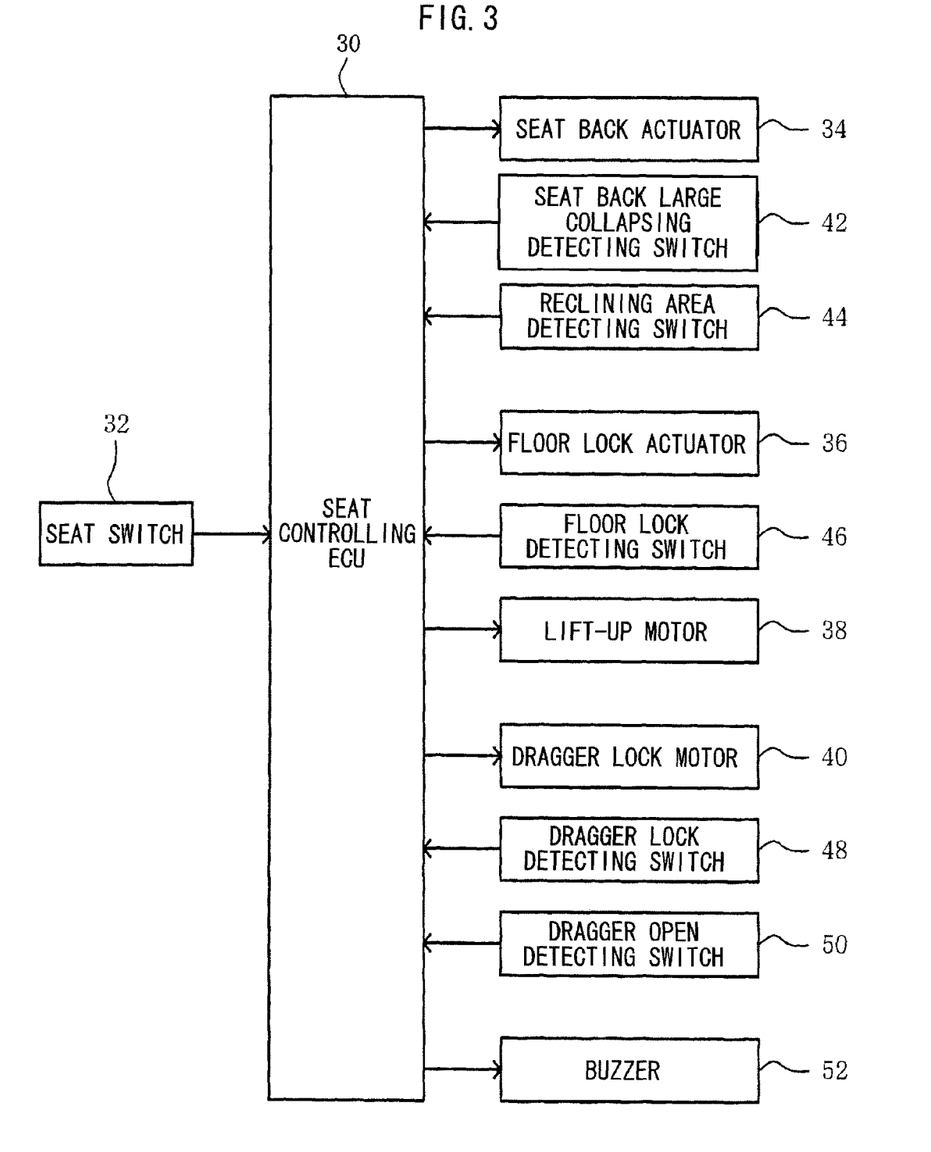
FIG. 3 is a block diagram showing the structure of a control system of the vehicle seat device relating to the embodiment of the present invention.

Next, the structure of the control system of the vehicle seat device 10 relating to the embodiment of the present invention will be described. FIG. 3 is a block diagram showing the structure of the control system of the vehicle seat device 10 relating to the embodiment of the present invention.

At the vehicle seat device 10 relating to the embodiment of the present invention, movement of the vehicle seat device 10 to a retracted position and movement to a return position (a seatable position) are controlled by a seat controlling ECU 30.

A seat switch 32 for carrying out instructions to retract and return the vehicle seat device 10 is connected to the seat controlling ECU 30, and the retracting and returning operations of the vehicle seat 10 are controlled by a vehicle occupant operating this seat switch 32. For example, a see-saw type switch can be applied as the seat switch 32, and a retracting instruction can be carried out by pushing the switch one way, and a returning instruction can be carried out by pushing the switch the other way.

Further, a seat back actuator 34 for rotating the seat back 12 to the position of being superposed on the seat cushion 14, a floor lock actuator 36 engaging the floor strikers 20 that are provided at the floor panel and the floor locks 22, a lift-up motor 38 lifting-up the seat cushion 14 to the vehicle body side, and a dragger lock motor 40 connecting the striker 24 and the dragger unit 26, are connected to the seat controlling ECU 30.

In the present embodiment, due to the seat controlling ECU 30 driving the seat back actuator 34 in accordance with the instruction of the seat switch 32, the locking that restricts rotation of the seat back 12 toward the seat cushion 14 side is released, and the seat back 12 is rotated and collapsed in the direction of being superposed on the seat cushion 14, due to the reaction force of an urging means such as a spring or a seat cushion or the like. Further, at this time, due to the driving of the seat back actuator 34, the locking of the headrest 16 also is simultaneously released by using a wire or the like, and the headrest 16 is rotated and collapsed toward the front of the vehicle.

Then, in the state in which the headrest 16 collapses and the seat back 12 is collapsed, due to the seat controlling ECU 30 driving the lift-up motor 38, the vehicle seat device 10 is lifted-up to the vehicle body side. At the time when the vehicle seat device 10 becomes the retracted position at the vehicle body side, the striker 24 of the seat back 12 rear surface of the vehicle seat device 10 and the dragger unit 26 are connected and locked by the dragger lock motor 40 being driven.

Further, in order to detect this series of respective operations, a seat back large collapsing detecting switch 42, a reclining area detecting switch 44, floor lock detecting switches 46, a dragger lock detecting switch 48, a dragger open detecting switch 50, and a buzzer 52 are connected to the seat controlling ECU 30.

The seat back large collapsing detecting switch 42 is provided at the rotating portion of the seat back 12 and the seat cushion 14, and detects that the seat back 12 is collapsed to the position of being superposed on the seat cushion 14, and outputs the results of detection to the seat controlling ECU 30.

The reclining area detecting switch 44 is provided at the rotating portion of the seat back 12 and the seat cushion 14, and detects that the reclining angle of the seat back 12 is a predetermined angle, and outputs the results of detection to the seat controlling ECU 30.

The floor lock detecting switches 46 are provided within the floor locks 22, and detect the engagement of the floor locks 22 and the lock strikers 20 that are provided at the floor panel, and output the results of detection to the seat controlling ECU 30.

The dragger lock detecting switch 48 is provided within the dragger unit 26, and detects the connecting (locking) of the striker 24 and the dragger unit 26, and outputs the results of detection to the seat controlling ECU 30.

The dragger open detecting switch 50 is provided within the dragger unit 26, and detects release of locking of the dragger unit 26, and outputs the results of detection to the seat controlling ECU 30.

Figure 4:
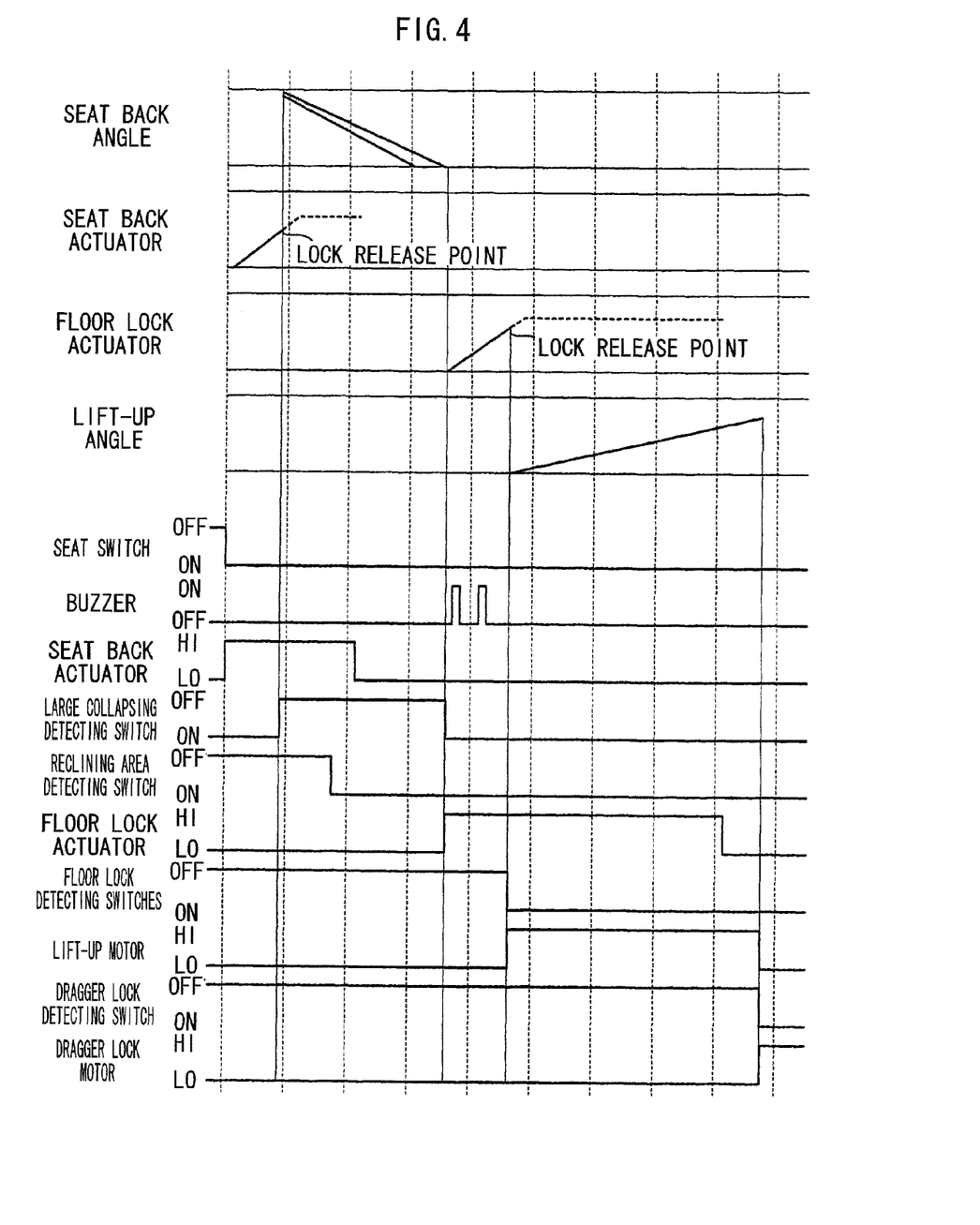
FIG. 4 is a drawing showing the timings of respective operations of the vehicle seat device, and signals of respective detecting switches, at a time of retracting processing.

Here, the flow of the retracting processing, that the seat controlling ECU 30 carries out and that retracts the vehicle seat device 10 to the vehicle body side, will be described. FIG. 4 is a drawing showing the timings of the respective operations of the vehicle seat device 10 and the signals of the respective detecting switches, at the time of retracting processing.

As shown in FIG. 4, when the seat switch 32 is turned on to the retraction instructing side, the seat back actuator 34 is started to operate, and releases locking of the seat back 12 and the seat cushion 14. This releasing of the locking is detected by the seat back large collapsing detecting switch 42. At the time when the locking of the seat back 12 and the seat cushion 14 is released, the seat back large collapsing detecting switch 42 changes from on to off, and the seat back 12 starts rotating due to the urging of the spring or the like, and the seat back angle gradually falls. Note that, due to the off of the seat back large collapsing detecting switch 42 and the on of the reclining area switch 44 being detected, it is detected that the seat back 12 is collapsed toward the seat cushion 14 side.

When the seat back 12 collapses and the seat back 12 rotates to the position at which it is superposed on the seat cushion 14, the seat back large collapsing detecting switch 42 changes from off to on, and due thereto, movement of the seat back 12 to the position of being superposed on the seat cushion 14 can be detected.

Next, when the movement of the seat back 12 to the position of being superposed on the seat cushion 14 is detected, the floor lock actuator 36 is driven. At this time, the buzzer 52 is turned on and off, and the vehicle occupant is notified of the start of retracting of the vehicle seat device 10. Then, at the time when the floor lock actuator 36 becomes a predetermined angle, the engagement of the lock strikers 20 and the floor locks 22 is released, and the floor lock detecting switches 46 turn on.

At the time when the floor lock detecting switches 46 turn on, the lift-up motor 38 is operated. Due thereto, the vehicle seat device 10 is lifted-up to the vehicle body side, and the lift-up angle gradually changes. Then, at the time when the lift-up angle becomes a predetermined angle, the dragger lock detecting switch 48 turns on, the dragger lock motor 40 is operated, the dragger unit 26 and the striker 24 of the seat back 12 rear surface are locked, and the retracting operation ends.

Figure 5:
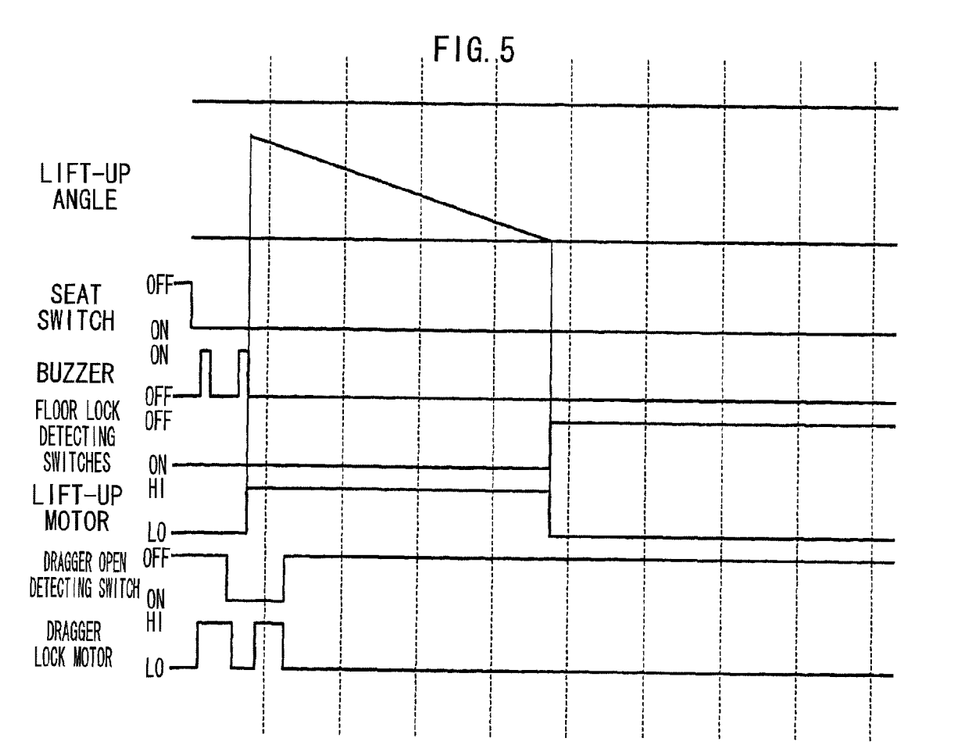
FIG. 5 is a drawing showing the timings of respective operations of the vehicle seat device, and signals of the respective detecting switches, at a time of returning processing.

Next, the flow of the returning processing, that the seat controlling ECU 30 carries out and that returns the vehicle seat device 10 to the seatable position, will be described. FIG. 5 is a drawing showing the timings of the respective operations of the vehicle seat device 10 and the signals of the respective detecting switches, at a time of returning processing.

First, when the seat switch 32 is turned on to the return instructing side, the buzzer 52 is turned on and off and notification is given of the start of returning of the vehicle seat device 10, and the dragger lock motor is operated.

When the dragger lock motor operates, the dragger open detecting switch 50 turns on at the lock released position. Then, at the time when the time period for the striker 24 to move away from the dragger unit 26 due to the reaction force of rubber or the like elapses, the lift-up motor 38 is operated, and lifts the vehicle seat device 10 down in the direction of the return position. Due thereto, the lift angle gradually changes, and the seat cushion 14 moves to the return position.

When the vehicle seat device 10 moves in the direction of the return position, the engagement of the floor panel and the floor locks 22 is detected by the floor lock detecting switches 46. Due thereto, the lock strikers 20 and the floor locks 22 are engaged, and the returning operation ends.

Then, due to a vehicle occupant manually setting the seat back 12 upright, the vehicle seat device 10 can be made to be seatable.

Note that FIG. 4 and FIG. 5 are shown simplistically, with the response times and the like of the respective switches, the respective actuators, the respective motors and the like omitted therefrom, and in actuality, the response times and the like must be taken into consideration.

Next, operation of the vehicle seat device 10 relating to the embodiment of the present invention, that is structured as described above, will be described.

Figure 6:
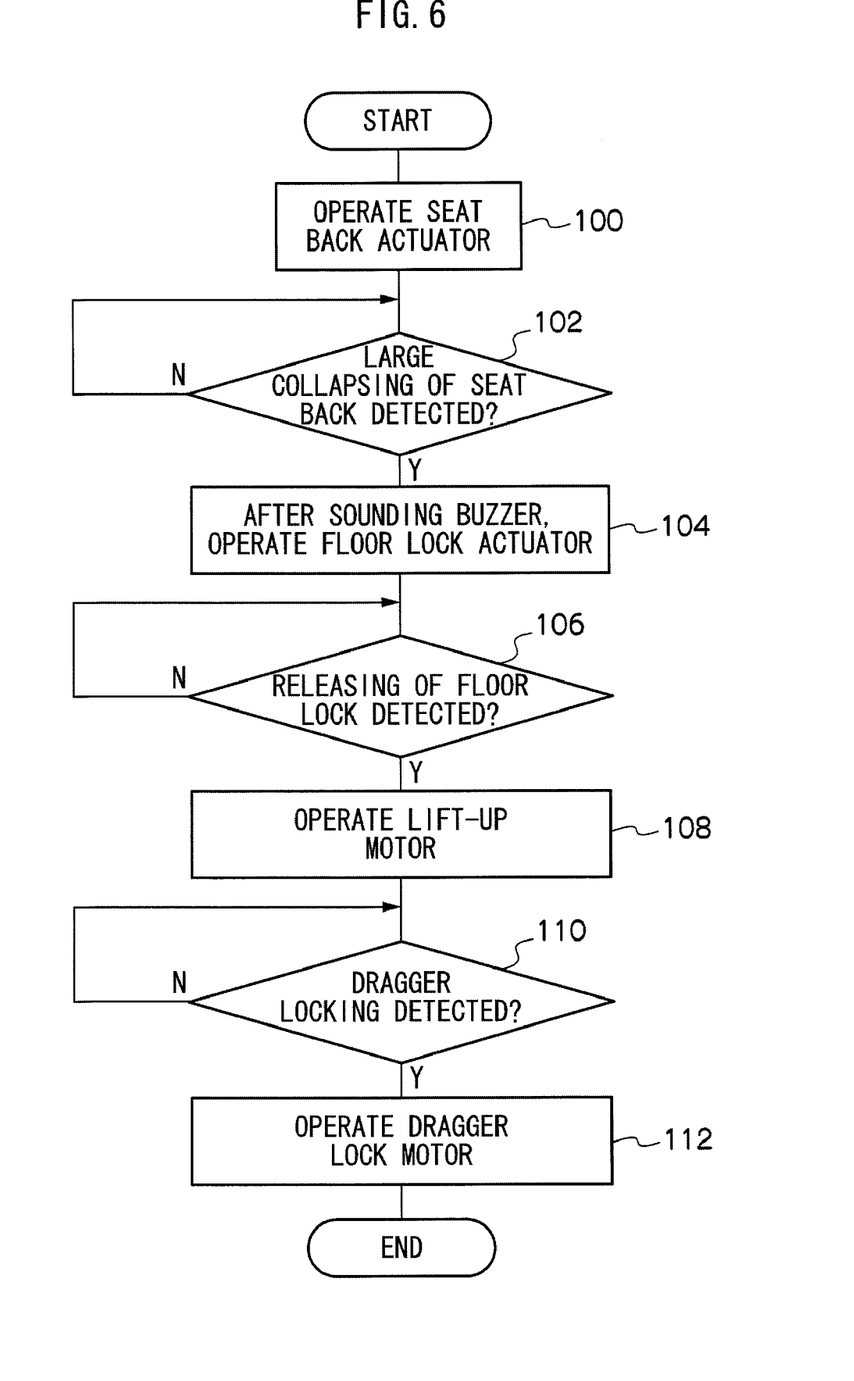
FIG. 6 is a flowchart showing an example of the flow of retracting processing at a time of retracting the vehicle seat device relating to the embodiment of the present invention.

FIG. 6 is a flowchart showing an example of the flow of retracting processing at the time of retracting the vehicle seat device 10 relating to the embodiment of the present invention. Note that the retracting of the vehicle seat device 10 is carried out by continuously operating the retracting instruction of the seat switch 32.

When the seat switch 32 is operated and retracting of the vehicle seat device 10 is instructed, in step 100, the seat back actuator 34 is operated, and the routine moves on to step 102. Due thereto, the locking of the seat back 12 and the seat cushion 14 of the vehicle seat device 10 is released, the locking of the headrest 16 is released, the seat cushion 14 rotates and is collapsed, and the headrest 16 also rotates and is collapsed.

In step 102, it is judged whether or not seat back large collapsing is detected. Namely, it is judged whether or not large collapsing of the seat back (rotation of the seat back 12 to the position of being superposed on the seat cushion 14) is detected by the seat back large collapsing detecting switch 42, and the routine stands-by until this judgment is affirmative, and moves on to step 104.

In step 104, after the buzzer is sounded, the floor lock actuator 36 is operated, and the routine moves on to step 106. Due thereto, the vehicle occupant is notified of the start of the retracting operation, and the engagement of the floor panel and the floor locks 22 is released.

In step 106, it is judged whether or not releasing of the floor locks 22 is detected. In this judgment, it is judged whether or not releasing of the floor locks 22 is detected by the floor lock detecting switches 46, and the routine stands-by until this judgment is affirmative, and moves on to step 108.

In step 108, the lift-up motor 38 is operated, and the routine moves on to step 110. Namely, due to the operation of the lift-up motor, the seat back 12 is, in a state of being superposed on the seat cushion 14, moved to the vehicle body side.

In step 110, it is judged whether or not dragger locking is detected. In this judgment, it is judged whether or not connecting of the dragger unit 26 and the striker 24 of the seat back 12 rear surface is detected by the dragger lock detecting switch 48, and the routine stands-by until this judgment is affirmative, and moves on to step 112.

In step 112, the dragger lock motor 40 is operated, and the series of the retracting of the vehicle seat device 10 ends. Namely, the vehicle seat device 10 is fixed to the vehicle body side by the dragger unit 26.

In this way, by carrying out the retracting processing, the vehicle seat device 10 can be moved automatically to the retracted position. Therefore, without placing a burden on the vehicle occupant, the vehicle seat device 10 can be easily moved to the retracted position, and can be reliably fixed at the retracted position.

Further, because the retracting processing is carried out by continuously operating the retracting instruction of the seat switch 32, if operation of the seat switch 32 is ceased, the retracting processing stops, and therefore, it is possible to prevent nipping-in or the like.

Figure 7:
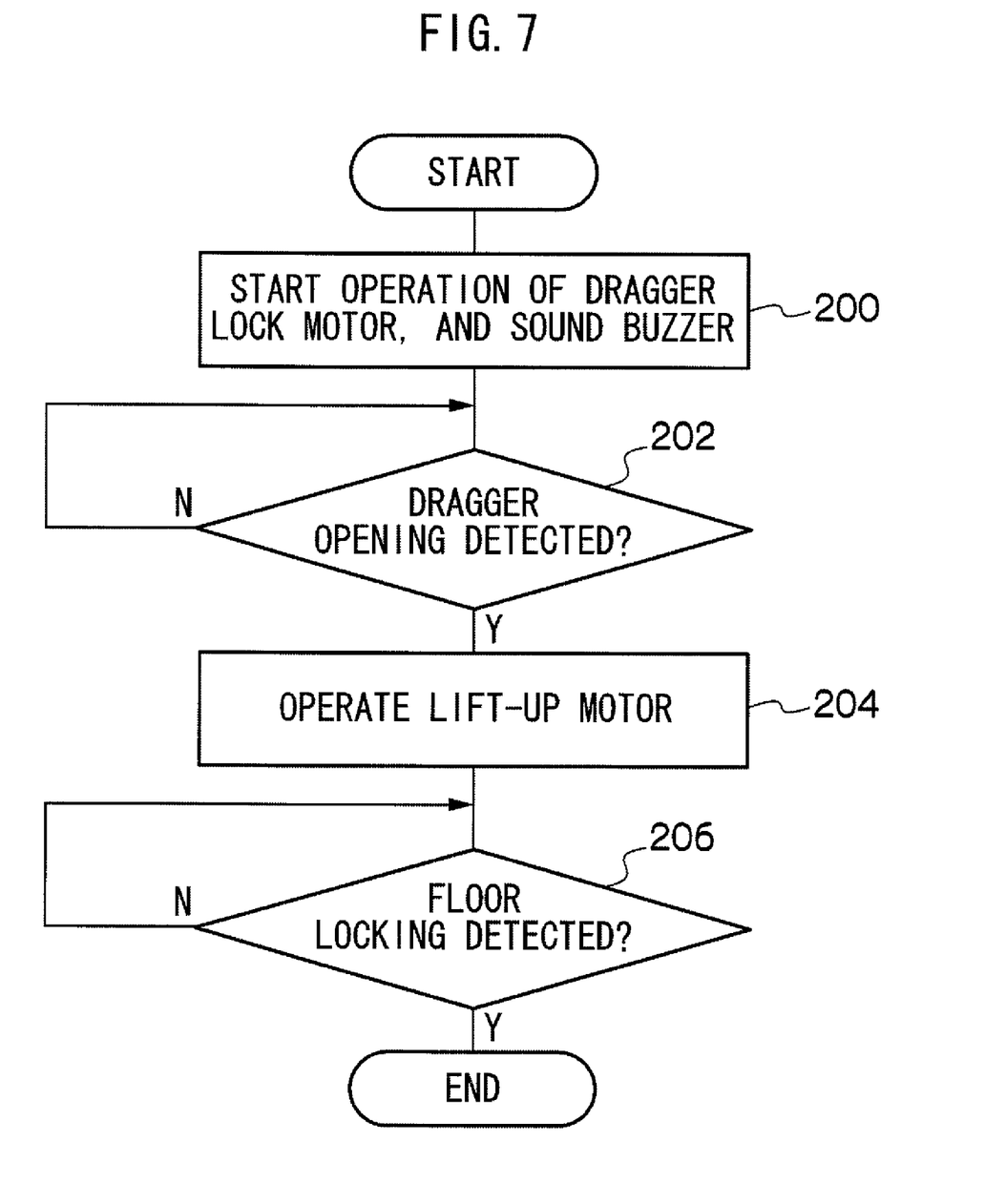
FIG. 7 is a flowchart showing an example of the flow of returning processing at a time of returning the vehicle seat device relating to the embodiment of the present invention.

Next, the returning processing at the time of returning the vehicle seat device 10 relating to the embodiment of the present invention will be described. FIG. 7 is a flowchart showing an example of the flow of returning processing at a time of returning the vehicle seat device 10 relating to the embodiment of the present invention. Note that the returning of the vehicle seat device 10 is carried out by continuously operating the returning instruction of the seat switch 32.

When the seat switch 32 is operated and returning of the vehicle seat device 10 is instructed, in step 200, operation of the dragger lock motor is started and the buzzer is sounded, and the routine moves on to step 202. Due thereto, the connecting of the dragger unit 26 and the vehicle seat device 10 is released, and the vehicle occupant is notified of the start of the returning operation.

In step 202, it is judged whether or not dragger opening is detected. In this judgment, it is judged whether or not releasing of the locking of the dragger unit 26 and the striker 24 is detected by the dragger open detecting switch 50, and the routine stands-by until this judgment is affirmative, and moves on to step 204.

In step 204, the lift-up motor is operated, and the routine moves on to step 206. Namely, the vehicle seat device 10 is moved from the vehicle body side to the return position.

In step 206, it is judged whether or not floor locking is detected. In this judgment, it is judged whether or not engagement of the lock strikers 20 and the floor locks 22 is detected by the floor lock detecting switches 46, and the routine stands-by until this judgment is affirmative. At the time when the judgment is affirmative, the returning processing ends.

Due thereto, due to the vehicle occupant manually setting the seat back 12 upright, the vehicle seat device 10 is made to be seatable.

In this way, by carrying out the returning processing, the vehicle seat device 10 can be moved automatically to the return position. Therefore, without placing a burden on the vehicle occupant, the vehicle seat device 10 can be easily moved to the return position.

Accordingly, at the vehicle seat device 10 relating to the present embodiment, retracting and returning can be easily carried out merely by operating the seat switch 32, and therefore, the vehicle seat device can be retracted and returned without placing a burden on the vehicle occupant.

Further, when the vehicle seat device moves to the retracted position, it is fixed to the vehicle body side by the dragger unit 26, and therefore, the vehicle sat device 10 can be reliably fixed at the retracted position.

Figure 8:
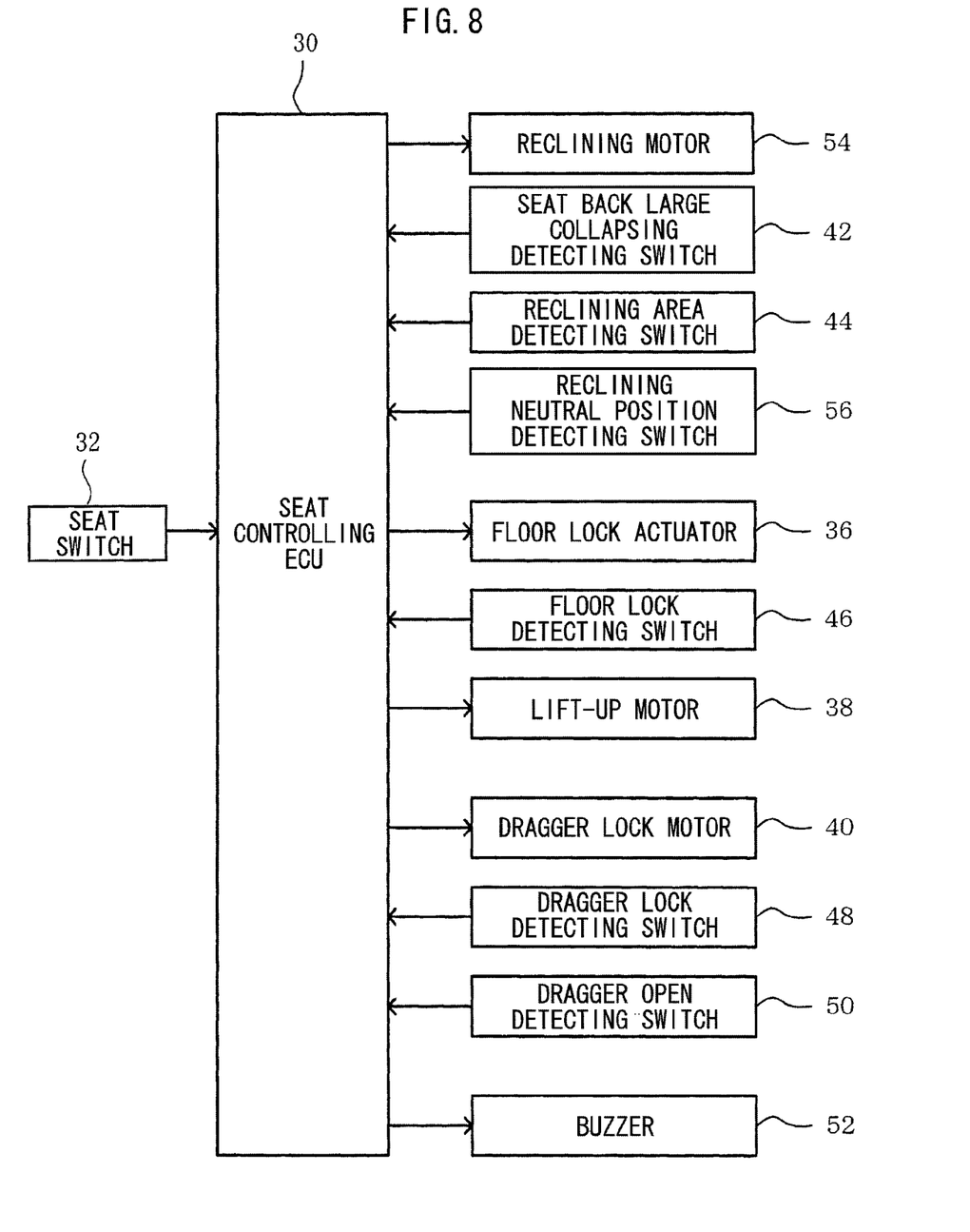
FIG. 8 is a block diagram showing the structure of a control system in a modified example of the vehicle seat device relating to the embodiment of the present invention.

Next, a modified example of the vehicle seat device 10 relating to the embodiment of the present invention will be described. FIG. 8 is a block diagram showing the structure of a control system in the modified example of the vehicle seat device 10 relating to the embodiment of the present invention.

In the above-described embodiment, a structure is described in which, when collapsing the seat back 12 toward the seat cushion 14, the lock that restricts rotation of the seat back 12 toward the seat cushion 14 side is released by the seat back actuator 34, and the seat back 12 is collapsed to the position of being superposed on the seat cushion 14 by the reaction force of an urging means such as a spring or the seat cushion 14 or the like. However, in the modified example, a reclining motor is provided instead of the seat back actuator 34, and the seat back 12 is rotated by the reclining motor 54. The other structures are the same, and therefore, only the difference will be described.

Further, because the seat back 12 is rotated by the reclining motor 54, there is further provided a reclining neutral position detecting switch 56 that detects a neutral position of the reclining.

By structuring in this way as well, the retracting processing and returning processing can be carried out in the same way as in the above-described embodiment.

Figure 9:
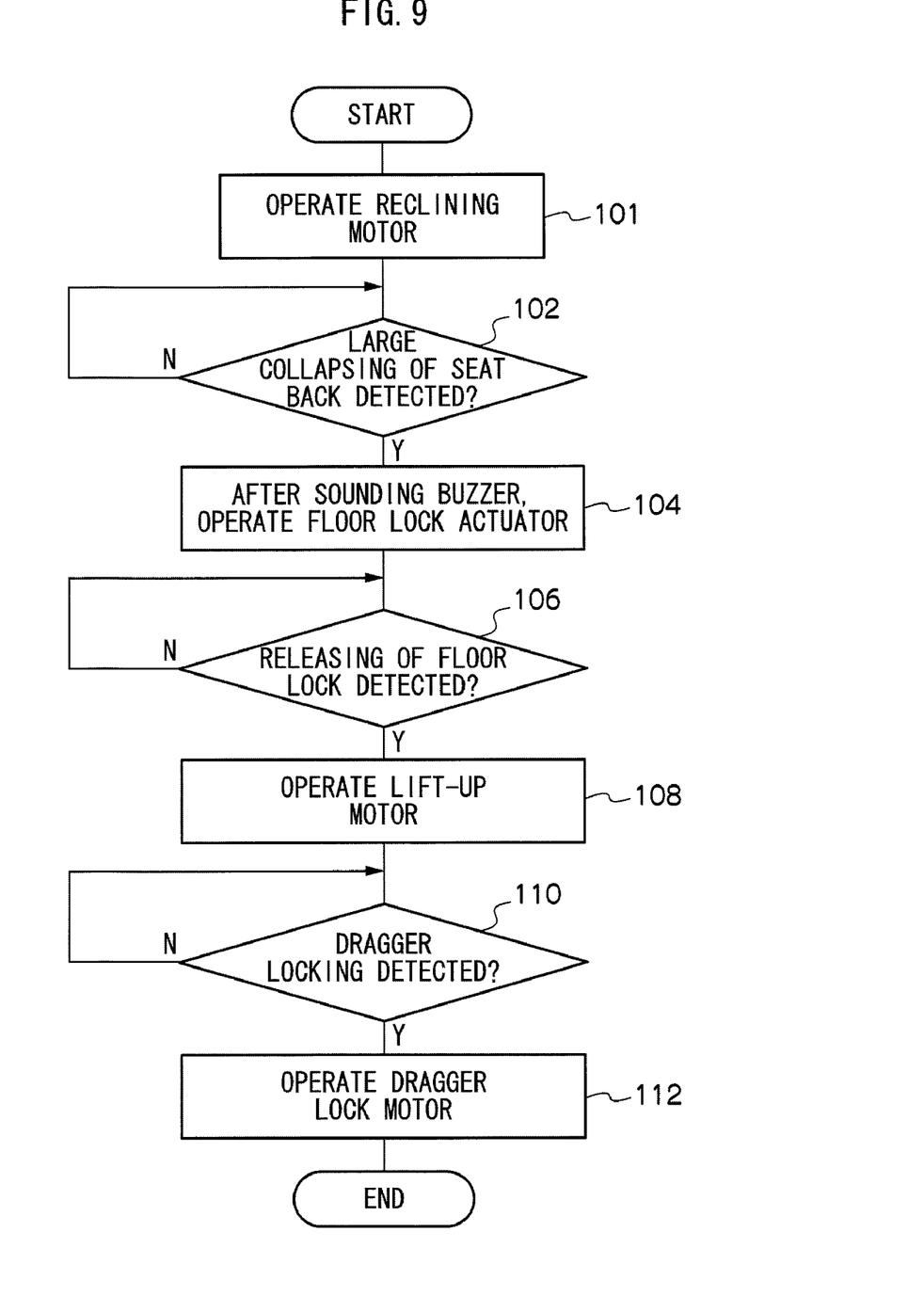
FIG. 9 is a flowchart showing an example of the flow of retracting processing in the modified example of the vehicle seat device relating to the embodiment of the present invention.

Next, the retracting processing in the modified example of the vehicle seat device relating to the embodiment of the present invention will be described. FIG. 9 is a flowchart showing an example of the flow of retracting processing in the modified example of the vehicle seat device relating to the embodiment of the present invention. Note that the same processings as in the above-described embodiment will be described with the same reference numerals applied thereto. Further, in the modified example as well, the retracting of the vehicle seat device 10 is carried out by continuously operating the retracting instruction of the seat switch 32.

When the seat switch 32 is operated and retracting of the vehicle seat device 10 is instructed, in step 101, the reclining motor 54 is operated, and the routine moves on to step 102. Due thereto, the seat back 12 of the vehicle seat device 10 rotates and is moved to the position of being superposed on the seat cushion 14. Note that, with regard to the headrest 16 as well, an actuator or the like may be provided and the headrest 16 may move electrically, or the headrest 16 also may rotate by using a wire or the like accompanying the rotation of the seat back 12.

In step 102, it is judged whether or not seat back large collapsing is detected. Namely, it is judged whether or not large collapsing of the seat back (rotation of the seat back 12 to the position of being superposed on the seat cushion 14) is detected by the seat back large collapsing detecting switch 42, and the routine stands-by until this judgment is affirmative, and moves on to step 104.

In step 104, after the buzzer is sounded, the floor lock actuator 36 is operated, and the routine moves on to step 106. Due thereto, the vehicle occupant is notified of the start of the retracting operation, and the engagement of the floor panel and the floor locks 22 is released.

In step 106, it is judged whether or not releasing of the floor locks 22 is detected. In this judgment, it is judged whether or not releasing of the floor locks 22 is detected by the floor lock detecting switches 46, and the routine stands-by until this judgment is affirmative, and moves on to step 108.

In step 108, the lift-up motor 38 is operated, and the routine moves on to step 110. Namely, due to the operation of the lift-up motor, the seat back 12 is, in a state of being superposed on the seat cushion 14, moved to the vehicle body side.

In step 110, it is judged whether or not dragger locking is detected. In this judgment, it is judged whether or not connecting of the dragger unit 26 and the striker 24 of the seat back 12 rear surface is detected by the dragger lock detecting switch 48, and the routine stands-by until this judgment is affirmative, and moves on to step 112.

In step 112, the dragger lock motor 40 is operated, and the series of the retracting of the vehicle seat device 10 ends. Namely, the vehicle seat device 10 is fixed to the vehicle body side by the dragger unit 26.

In this way, by carrying out the retracting processing in the modified example as well, the vehicle seat device 10 can be moved automatically to the retracted position. Therefore, without placing a burden on the vehicle occupant, the vehicle seat device 10 can be moved to the retracted position, and can be reliably fixed at the retracted position.

Further, because the retracting processing is carried out by continuously operating the retracting instruction of the seat switch 32, if operation of the seat switch 32 is ceased, the retracting processing stops, and therefore, it is possible to prevent nipping-in or the like.

Figure 10:
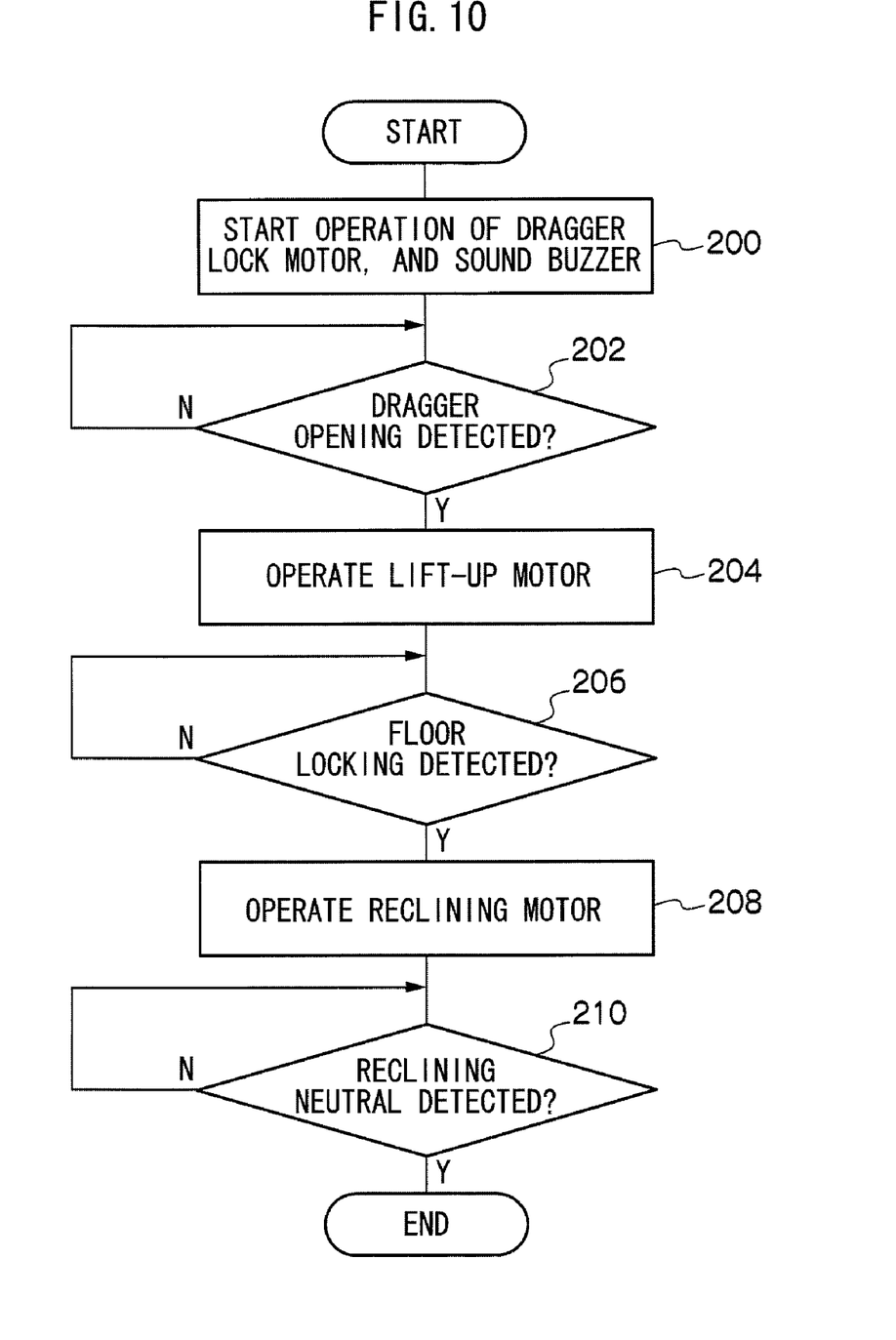
FIG. 10 is a flowchart showing an example of the flow of returning processing in the modified example of the vehicle seat device relating to the embodiment of the present invention.

Next, the returning processing in the modified example of the vehicle seat device relating to the embodiment of the present invention will be described. FIG. 10 is a flowchart showing an example of the flow of returning processing in the modified example of the vehicle seat device 10 relating to the embodiment of the present invention. Note that the same processings as in the above-described embodiment will be described with the same reference numerals applied thereto. Further, in the modified example as well, the returning of the vehicle seat device 10 is carried out by continuously operating the returning instruction of the seat switch 32.

When the seat switch 32 is operated and returning of the vehicle seat device 10 is instructed, in step 200, operation of the dragger lock motor is started and the buzzer is sounded, and the routine moves on to step 202. Due thereto, the connecting of the dragger unit 26 and the vehicle seat device 10 is released, and the vehicle occupant is notified of the start of the returning operation.

In step 202, it is judged whether or not dragger opening is detected. In this judgment, it is judged whether or not releasing of the locking of the dragger unit 26 and the striker 24 is detected by the dragger open detecting switch 50, and the routine stands-by until this judgment is affirmative, and moves on to step 204.

In step 204, the lift-up motor is operated, and the routine moves on to step 206. Namely, the vehicle seat device 10 is moved from the vehicle body side to the return position.

In step 206, it is judged whether or not floor locking is detected. In this judgment, it is judged whether or not engagement of the lock strikers 20 and the floor locks 22 is detected by the floor lock detecting switches 46, and the routine stands-by until this judgment is affirmative. At the time when the judgment is affirmative, the routine moves on to step 208.

In step 208, the reclining motor 54 is operated, and the routine moves on to step 210. Due thereto, the seat back 12 of the vehicle seat device 10 is rotated, and the seat back 12 is moved to the position at which the vehicle occupant can sit. Note that, for the headrest 16 as well, in a case in which an actuator or the like is provided and the headrest 16 moves electrically, the headrest 16 can simultaneously be set upright to the seatable position.

In step 210, it is judged whether or not the reclining neutral position is detected. In this judgment, it is judged whether or not the neutral position of the reclining angle is detected by the reclining neutral position detecting switch 56, and the routine stands-by until this judgment is affirmative. At the time when the judgment is affirmative, the returning processing ends.

In this way, by carrying out the returning processing in the modified example as well, the vehicle seat device 10 can be moved automatically to the return position. Therefore, without placing a burden on the vehicle occupant, the vehicle seat device 10 can be easily moved to the return position. Further, in the modified example, because the seat back 12 also moves to the reclining neutral position, the burden on the vehicle occupant can be lessened even more than in the above-described embodiment.

Accordingly, in the modified example as well, retracting and returning can be easily carried out merely by operating the seat switch 32, and therefore, the vehicle seat device can be retracted and returned without placing a burden on the vehicle occupant. Further, when the vehicle seat device moves to the retracted position, it is fixed at the vehicle body side by the dragger unit 26, and therefore, the vehicle seat device 10 can be reliably fixed at the retracted position.

Note that, in the above-described embodiment and modified example, the retracting processing and returning processing are carried out by continuously operating the seat switch 32, and by releasing the seat switch 32 at the time of nipping-in, immediate stopping of operation is possible. However, the sensing of nipping-in is not limited to this, and, for example, the seat switch 32 may be provided, as a structure that instructs the start of retracting or the start of returning, with an overload sensing means (a pressure switch or a touch sensor or the like) that detects nipping-in when the vehicle seat device 10 is lifted-up to the vehicle body side or is lifted-down from the vehicle body side, and operation may be stopped automatically. Further, in the modified example, an overload sensing means (a pressure switch or a touch sensor or the like) that detects nipping-in when the seat back 12 rotates may similarly be provided, and operation may be stopped automatically.

DESCRIPTION OF THE REFERENCE NUMERALS

10 vehicle seat device
12 seat back
14 seat cushion
18 lift-up unit
20 lock striker
22 floor lock
24 striker
26 dragger unit
30 seat controlling ECU
32 seat switch
34 seat back actuator
36 floor lock actuator
38 lift-up motor
40 dragger lock motor
54 reclining motor

The invention claimed is:

1. A vehicle seat device comprising:
   seat back rotating means for rotating a seat back to a position of being superposed on a seat cushion;
   engaging means for releasably engaging the seat cushion and a floor panel;
   seat cushion rotating means for rotating the seat cushion to a vehicle body side with one side, that runs along a vehicle longitudinal direction, of the seat cushion being a center of rotation;
   connecting means for connecting a rear surface of the seat back and the vehicle body side;
   instructing means for instructing retraction of a vehicle seat; and
   controlling means for, in a case in which retraction of the vehicle seat is instructed by the instructing means, controlling the seat back rotating means such that the seat back rotates to the position of being superposed on the seat cushion, and controlling the engaging means such that engagement of the seat cushion and the floor panel is released, and controlling the seat cushion rotating means such that the seat cushion rotates to the vehicle body side, and thereafter, controlling the connecting means such that the rear surface of the seat back and the vehicle body side are connected.

2. The vehicle seat device of claim 1, wherein the controlling means carries out control only while instructing of retraction of the vehicle seat is being carried out by the instructing means.

3. The vehicle seat device of claim 1, further comprising:
   a restricting means for restricting the rotation of the seat back in a state in which a vehicle occupant may be seated on the seat cushion;
   wherein the seat back rotating means rotates the seat back toward the seat cushion due to release of the rotation restriction provided by the restricting means.

4. The vehicle seat device of claim 2, further comprising:
   a restricting means for restricting the rotation of the seat back in a state in which a vehicle occupant may be seated on the seat cushion;
   wherein the seat back rotating means rotates the seat back toward the seat cushion due to release of the rotation restriction provided by the restricting means.

5. The vehicle seat device of claim 1, wherein the instructing means further has a function of instructing returning of the vehicle seat from a retracted position, and in a case in which the returning is instructed by the instructing means, the controlling means controls the connecting means so as to release connection of the rear surface of the seat back and the vehicle body side, and controls the seat cushion rotating means such that the seat cushion rotates from the vehicle body side toward the floor panel, and controls the engaging means such that seat cushion and the floor panel are engaged, and thereafter, controls the seat back rotating means such that an angle formed by the seat back and the seat cushion becomes a predetermined angle.

6. The vehicle seat device of claim 2, wherein the instructing means further has a function of instructing returning of the vehicle seat from a retracted position, and in a case in which the returning is instructed by the instructing means, the controlling means controls the connecting means so as to release connection of the rear surface of the seat back and the vehicle body side, and controls the seat cushion rotating means such that the seat cushion rotates from the vehicle body side toward the floor panel, and controls the engaging means such that seat cushion and the floor panel are engaged, and thereafter, controls the seat back rotating means such that an angle formed by the seat back and the seat cushion becomes a predetermined angle.

7. The vehicle seat device of claim 3, wherein the instructing means further has a function of instructing returning of the vehicle seat from a retracted position, and in a case in which the returning is instructed by the instructing means, the controlling means controls the connecting means so as to release connection of the rear surface of the seat back and the vehicle body side, and controls the seat cushion rotating means such that the seat cushion rotates from the vehicle body side toward the floor panel, and thereafter, controls the engaging means such that seat cushion and the floor panel are engaged.

8. The vehicle seat device of claim 4, wherein the instructing means further has a function of instructing returning of the vehicle seat from a retracted position, and in a case in which the returning is instructed by the instructing means, the controlling means controls the connecting means so as to release connection of the rear surface of the seat back and the vehicle body side, and controls the seat cushion rotating means such that the seat cushion rotates from the vehicle body side toward the floor panel, and thereafter, controls the engaging means such that seat cushion and the floor panel are engaged.

* * * * *